United States Patent [19]

Kurosawa

[11] 4,259,629

[45] Mar. 31, 1981

[54] CONTROL DEVICES OF INDUCTION MOTORS

[75] Inventor: Ryoichi Kurosawa, Tokyo, Japan

[73] Assignee: Tokyo Shibaura Denki Kabushiki Kaisha, Kawasaki, Japan

[21] Appl. No.: 937,823

[22] Filed: Aug. 29, 1978

[30] Foreign Application Priority Data

Sep. 19, 1977 [JP] Japan .............................. 52/112480

[51] Int. Cl.³ .......................................... H02P 7/36
[52] U.S. Cl. ................................... 318/807; 318/812
[58] Field of Search ............................ 318/799–803, 318/807–812

[56] References Cited

U.S. PATENT DOCUMENTS

| 3,805,135 | 4/1974 | Blaschke | 318/803 |
| 3,824,437 | 7/1974 | Blaschke | 318/803 |
| 4,001,660 | 1/1977 | Lipo | 318/802 |
| 4,023,083 | 5/1977 | Plunkett | 318/802 |
| 4,041,361 | 8/1977 | Cornell | 318/802 |
| 4,088,935 | 5/1978 | D'Atre et al. | 318/802 |

OTHER PUBLICATIONS

Flöter, Ripperger, *Field–Oriented Closed–Loop Control of an Induction Machine . . .* , Siemens Review No. 6 (1972), pp. 248-251.

*Primary Examiner*—Gene Z. Rubinson
*Attorney, Agent, or Firm*—Oblon, Fisher, Spivak, McClelland & Maier

[57] ABSTRACT

The control device is provided with a frequency converter for feeding electric power to an induction motor and a compensating circuit for compensating for the delay of the response of the field flux to a control target value. The second transfer function of the compensating circuit is selected such that the resultant of the first transfer function of the field flux with respect to a control target and the second transfer function would be a constant.

6 Claims, 16 Drawing Figures

CONTROL DEVICES OF INDUCTION MOTORS

This invention relates to a control device of an induction motor fed by a frequency converter.

An induction motor fed by a frequency converter has been used as a variable speed induction motor. However, the response characteristic of such a prior art variable speed induction motor to a control target value (instructed value) is inferior relative to that of a direct current motor. For this reason there have been many applications in which it is difficult to use a variable speed induction motor.

As a result of recent research, it was found that the poor response characteristic of the induction motor is caused by the following facts. More particularly, the driving current supplied by a frequency converter is fed to the primary winding of the induction motor, and the power factor of the driving current varies when the slip of the motor is caused to vary due to variation of the motor load. This causes the phase of the relative to the current flowing through the primary winding to vary thus varying the frequency of the field flux in the induction motor. Such variation in the frequency of the field flux caused by the variation in the load makes it difficult to provide a stable control of the motor speed.

The problem just described has been solved by treating the driving current as a vector represented by two components, for example, a real axis component and an imaginary axis component and by arithmetically processing these two components. According to one method the induced voltage on the field flux of the induction motor has been detected as vectors. Thus, the control of the driving current utilizing the detected results is effected by a vector signal including not only the amplitude and frequency components of the driving current but also the phase component thereof. This expedient can solve satisfactorily the problem described above, but requires special means for detecting the induced voltage or the field flux of the induction motor.

According to another method of solving the problem, it has been proposed to vary the amplitude component of the driving current and to previously vary the phase component thereof, as disclosed in the Japanese patent application disclosure No. 11125/1976. This method is superior than the former method because it is not necessary to use special detecting means described above for detecting the induced voltage or the field flux. However with regard to its response characteristic there is a problem to be solved caused by the fact that when the magnitude of the current component whose phase has been varied to the in-phase with the exciting current is varied the field flux does not immediately follow the variation of the current component. This reason may be considered as follows. More particularly, even when the current component which is in-phase with the exciting current varies, since the secondary winding of the induction motor comprises a short circuited circuit, the variation in the field flux caused by the variation of the current component would be cancelled by the variation in the magnetic flux generated by the short circuit current induced in the secondary winding. Such cancellation occurs transiently while the current component which is in-phase with the exciting current is varying. Accordingly, the increase in the field flux corresponding to the increase in the current component occurs after the current component has increased to a prescribed value. Thus, the variation in the field flux lags the variation in the current component of the driving current which is in-phase with the exciting current thereby causing variations in the output torque of the induction motor.

Accordingly, it is an object of this invention to provide an improved control device of an induction motor capable of improving the response characteristic of the field flux to a target value thereof when controlling the field flux of the motor.

According to this invention there is provided a control device of an induction motor comprising a frequency converter for feeding electric power to the induction motor; and compensating means for compensating the delayed response of the field flux generated in the induction motor to a control target value, which the compensating means provides a second transfer function such that the resultant of the first transfer function of the field flux with respect to a control target and to second transfer function would be a constant.

According to the control device described above, since the transfer function of the field flux with respect to a control target is made to be a constant, it is possible to not only increase the response speed of the flux control but also to cause the field flux to correctly correspond to the control target.

This invention can be more fully understood from the following detailed description when taken in connection with the accompanying drawings, in which:

In the accompanying drawings.

A preferred embodiment of this invention will be described with reference to FIG. 1 through FIG. 14. Throughout the drawings the same or like elements are designated by the same reference characters.

Figure 1:
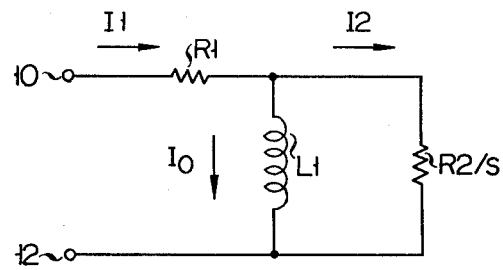
FIG. 1 shows a simplified equivalent circuit of an induction motor.

FIG. 1 shows a simplified equivalent circuit of an induction motor in which the leakage reactance has been neglected for the sake of description. In FIG. 1, an input terminal 10 is connected to one end of an excitation inductance L1 through a primary resistance R1, and the other end of excitation inductance L1 is connected to the other input terminal 12. A resistance R2/S is connected in parallel with the excitation inductance L1 where "R2" represents the secondary resistance and "S" the slip coefficient. The driving current, that is the primary current I1 applied to input terminal 10 is divided into the secondary current I2 flowing through the secondary winding and the exciting current $I_o$ flowing through the excitation inductance L1.

Figure 2A:
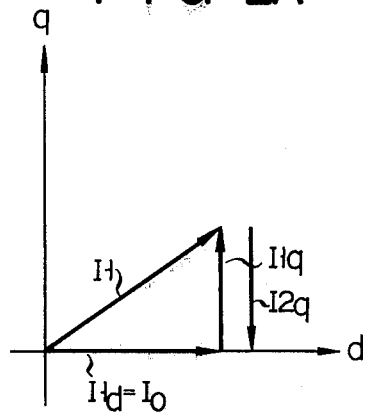
FIG. 2A is a vector diagram showing the primary current Il of an induction motor under a constant load condition.

FIG. 2A shows the vector of the primary current I1 under a steady state or constant load condition. In the rectangular coordinates, the abscissa "d" represents the real axis while the ordinate "q" the imaginary axis. It should be understood that the axis "d" and "q" are not necessarily the real and imaginary axis but may be rectangular coordinates. The coordinate system rotates about its origin depending upon the manner of supplying the driving current to the motor. The current I1 can be decomposed into a "d" axis component $I1_d$ and a "q" axis component $I1_q$. In the same manner the secondary current I2 can be decomposed into a "d" axis component $I2_d$ and a "q" axis component $I2_q$. Under the steady state, the excitation current $I_o$ is equal to the current component $I1_d$ but the secondary current I2 comprises only the "q" axis component $I2_q$. Under these conditions, the current component $I2_q$ is equal to the current component $I1_q$ but has an opposite sign.

The output torque at the motor under the condition shown in FIG. 2A is expressed by the following equation.

$$T = L1 \cdot I_o \cdot (-I2_q) = L1 \cdot I_o \cdot I1_q \quad (1)$$

From equation (1) it can be understood that in order to increase the torque T, the "q" axis current component should be increased. To increase the current component $I2_q$ by an external circuit of the motor, the "q" axis current component $I1_q$ should be increased. Since the secondary winding comprises a short circuited circuit the current component $I2_q$ quickly responds to the variation in the current component $I1_q$. For this reason, it is possible to control the output torque T at a high speed by the current component $I1_q$.

Figure 2B:
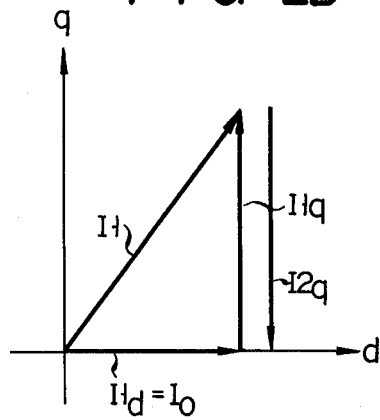
FIG. 2B is a vector diagram showing a case wherein the current component $Il_q$ of the primary current Il is increased for the purpose of increasing the output torque of the induction motor.

FIG. 2b shows a vector diagram wherein the "q" axis current component $I1_q$ of the primary current I1 has been increased for the purpose of increasing the output torque T.

Figure 2C:
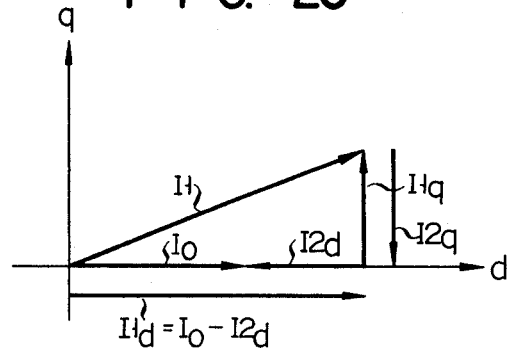
FIG. 2C is a vector diagram during a transient period immediately after the current component $Il_d$ which is in-phase with an exciting current $I_o$ of the primary current Il has been increased for the purpose of controlling the field flux of the induction motor.

However, field control of an induction motor is accompanied by the following factor that decreases the response speed of the control, as will be described in connection with FIG. 2C. More particularly, in order to increase the field flux $\phi$ of the motor, since it is necessary to increase the exciting current $I_o$, and to increase the exciting current $I_o$ by an external circuit of the motor, it is necessary to increase the "d" axis current component $I1_d$. However, even when the current component $I1_d$ is increased, the "d" axis current component $I2_d$ of the secondary current I2 is formed during the transient period in which the "d" axis current component $I1_d$ varies. This is caused by the fact that since the secondary winding comprises a short circuited circuit, the secondary circuit induces a phenomenon that tends to cancel the variation in the flux caused by the variation in the exciting current $I_o$. Thus, an increase in the current component $I1_d$ for the purpose of generating the "d" axis current component $I2_d$ does not result in a quick increase of the exciting current $I_o$.

The following relations represent the variations in the current component $I1_d$ and the exciting current $I_o$ $$L1(d/dt)I_o = -R2 \cdot I2_d \quad (2)$$

$$I_o - I2_d = I1_d \quad (3)$$

where "t" represents time. Equations (2) and (3) are applied to a transient period in which the "d" axis current component $I2_d$ is formed.

By eliminating $I2_d$ from equations (2) and (3) and by effecting Laplace transformation, the relationship between the current component $I1_d$ and the exciting current $I_o$, that is the transfer function G1(p) can be obtained by the following equation $$G1(p) = \frac{I_o(p)}{I1_d(p)} = \frac{1}{1 + \frac{L1}{R2}p} \quad (4)$$

where "p" represents the Laplace operator and $I_o(p)$ and $I1_d(p)$ are obtained by subjecting $I_o(t)$ and $I1_d(t)$, respectively, to Laplace transformation. (usually "s" is used as the Laplace operator but since in an induction motor "s" represents the slip coefficient, "p" is used herein as the Laplace operator for the purpose of avoiding confusion). Equation (4) shows that the response characteristic of the exciting current $I_o(p)$ in relation to the "d" axis current component $I1_d(p)$, that is the response characteristic of the field flux, is a linear delayed system which has a time constant L1/R2. Equation (4) can be represented by a block diagram shown in FIG. 3.

Let us denote by $I_{oR}(p)$ the exciting current instruction that gives a control target of the field flux of the induction motor. When the exciting current instruction $I_{oR}(p)$ is made to correspond directly to the current component $I1_d(p)$, as can be noted from equation (4), the exciting current $I_o(p)$ will respond with a time delay. However, this problem of delayed response can be solved by using a second transfer function which eliminates a term containing the parameter "P" of the transfer function G1(p). Thus, the problem can be solved by connecting a system having a new second transfer function G2(p) which satisfies an equation $$G1(p) \cdot G2(p) = \text{constant} \quad (5)$$

in series with a system having the transfer function G1(p). When the constant of equation (5) is equal to "1" the transfer function G2(p) becomes a reverse function of the transfer function G1(p). Thus, $$G2(p) = 1 + (L1/L2)p \tag{6}$$

Figure 3:
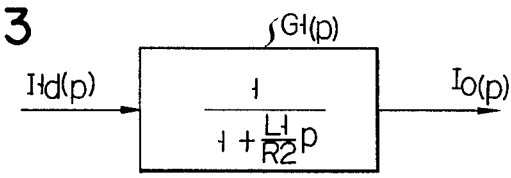
FIG. 3 is a block diagram showing the transfer function G1 of the exciting current $I_o$ with respect to the current component $Il_d$.
Figure 4:
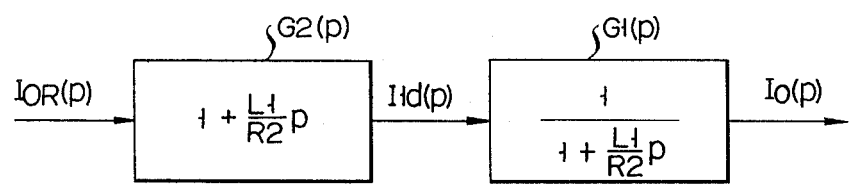
FIG. 4 is a block diagram showing a transfer function G2 utilized to compensate for the transfer function G1 shown in FIG. 3 together with the FIG. 3 transfer function.

FIG. 4 is a block diagram showing the manner of compensating for the response delay of the transfer system shown in FIG. 3 by using the transfer function G2(p). Thus, the instruction $I_{oR}(p)$ is transformed into the current component $I1_d(p)$ compensated by the transfer function G2(p) of the linear advanced system, and the compensated current component $I1_d(p)$ is transformed into the exciting current $I_o(p)$ by the transfer function G1(p) of the linear delayed system where the transfer function G1(p) is a natural transfer function of the induction motor. Since the overall transfer function of the system shown in FIG. 4 is "1", $$I_o(p) = I_{oR}(p) \tag{7}$$

The field flux $\phi$ of the motor is proportional to the exciting current $I_o(p)$. Thus, the transfer function of the field flux $\phi$ with reference to the instruction $I_{oR}(p)$ is made to be constant. Thus, by the system shown in FIG. 4, not only the control system is linearized but also the response speed of the flux control is increased.

From equations (1) and (7) the Laplace transformed motor torque T(P) is shown as follows.

$$T(p) = L1 \cdot I_{oR}(p) \cdot I1_q(p) \tag{8}$$

In equation (8), if the instruction $I_{oR}(p)$ is variable, the proportional coefficient between the output torque T(p) and the current component $I1_q(p)$ would vary when the instruction $I_{oR}(p)$ varies. To obviate the variation in the proportional coefficient, a torque instruction $T_R(p)$ which is proportional to the product of the current component $I1_q(p)$ and the instruction $I_{oR}(p)$ is used. This relationship is expressed by the following equation $$KT_R(p) = I_{oR}(p) \cdot I1_q(p) \tag{9}$$

where K represents the proportional constant.

By eliminating $I_{oR}(p) \cdot I1_q(p)$ in equations (8) and (9) we obtain $$T(p) = L1 \cdot K \cdot T_R(p) \tag{10}$$

Equation (10) shows that it is possible to linearly control the output torque T(p) of the motor when a torque instruction $T_R(p)$ that satisfies equation (9) is used. For example, when the constant K is selected to be K=1/L1 it is possible to obtain the relation $T(p) = T_R(P)$.

Figure 5:
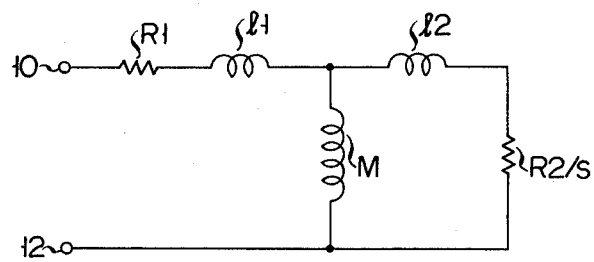
FIG. 5 shows an equivalent circuit of an induction motor where the leakage inductance is taken into consideration.

The above description was made with reference to FIG. 1 in which the leakage inductance was neglected. Where the leakage inductance is taken into consideration the equivalent circuit is shown by FIG. 5. Thus, the primary resistance R1 is connected in series with the primary leakage inductance l1 and the secondary resistance R2/S is similarly connected in series with the secondary leakage inductance l2, a primary-secondary mutual inductance M is connected in parallel with the serially connected leakage inductance l2 and the secondary resistance R2/S. When considering the matter ideologically replacing the field flux $\phi$ produced by the exciting current $I_o$ with the flux that links the secondary winding, it is possible to control the motor with the leakage inductance taken into consideration. In FIG. 5, the sum of the mutual inductance M and the secondary leakage inductance l2 corresponds to the excitation inductance L2. In this case the time constant is given by L2/R2 so that in the equivalent circuit shown in FIG. 5, the transfer function G1(p) is given by modifying equation (4a)

$$G1(p) = \frac{1}{1 + \frac{L2}{R2}p} \tag{4a}$$

Similarly, in the equivalent circuit shown in FIG. 5, equation (6) is modified as follows $$G2(p) = 1 + (L2/R2)p \tag{6a}$$

Furthermore, it is considered that the field flux $\phi$ is reduced to substantially M/M+l2 by the leakage inductance l2. Accordingly, the excitation inductance relating to the output torque T(p) is given by $(M/M+l2) \cdot M = M^2/L2$. Thus, in the equivalent circuit shown in FIG. 5, an equation representing the output torque T(p) is obtained by modifying equation (8a)

$$T(p) = (M^2/L2) \cdot I_{oR}(p) \cdot I1_q(p) \tag{8a}$$

In the same manner, the relationship between T(p) and $T_R(p)$ in the case of FIG. 5 can be obtained from equations (8a) and (9) as follows $$T(p) = (M^2/L2)KT_R(p) \tag{10a}$$

Comparison of equations (4) (8) and (10) with equations (4a) (8a) and (10a) shows that there is no fundamental difference between the equivalent circuits shown in FIGS. 1 and 5, and this fact has been confirmed by experiments.

Figure 6:
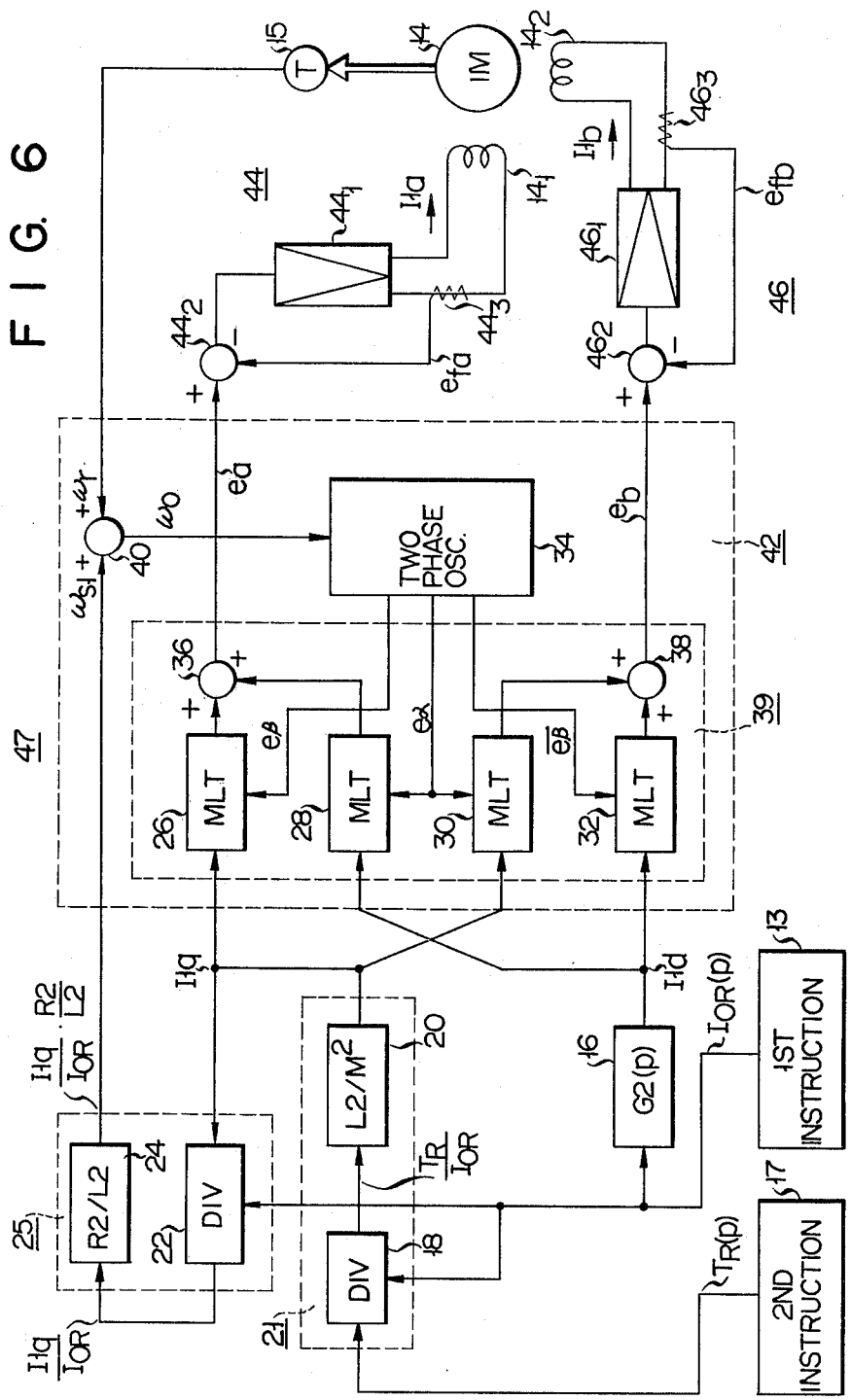
FIG. 6 is a block diagram showing details of the block diagram shown in FIG. 4 and illustrating one embodiment of the control device of an induction motor constructed in accordance with this invention.

The block diagram shown in FIG. 6 illustrates one embodiment of the control device of this invention. An exciting current instruction $I_{oR}(p)$ supplied from a first instruction set circuit 13 is converted into a current component $I1_d(p)$ by a compensating circuit 16. It is herein assumed that a two phase induction motor 14 shown in FIG. 6 is represented by FIG. 5. Then the transfer function of the exciting current $I_o(p)$ of the motor 14 with respect to the current component $I1_d(p)$ is of the linear delayed type as shown by equation (4a). This linear delayed type transfer function can be made a constant, for example "1", by making the transfer function G2(p) of the compensating circuit 16 in a form expressed by equation (6a). A tachometer generator 15 is coupled to the shaft of the motor 14 to detect its speed.

A torque instruction $T_R(p)$ generated by a second instruction set circuit 17 is applied to a divider 18 to obtain a signal $T_R/I_{oR}$. The output of the divider 18 is multiplied with a constant $L2/M^2$ by an amplifier 20 to obtain a current component $I1_q(p)$. In order to make the output torque T(p) of the motor 14 proportional to the instruction $T_R(p)$, equation (9) must be satisfied. By modyfying equation (9) an equation $I1_q = (T_R/I_{oR})K$ is obtained, and the righthand term $T_R/I_{oR}$ is formed by the divider 18. From equation (10a) it is clear that in order to make $T = T_R$, K must be equal to $L2/M^2$ which is supplied by the amplifier 20. A circuit 21 including the divider 18 and amplifier 20 functions to make the output torque T to be equal or proportional to the value of the instruction $T_R$. Where it is not necessary to linearize the relationship between the output torque T and the instruction $T_R$, the divider 18 may be omitted. Furthermore, when the output torque T is not required to correspond to the instruction $T_R$ at a ratio of 1:1 it is possible to omit the amplifier 20.

The current component $I1_q$ is converted into $I1_q/I_{oR}$ by the divider 22 and multiplied with the constant R2/L2 by an amplifier 24 to form a slip angular frequency signal $W_{S1}$. Where the motor 14 is operating under a steady condition, and where the transfer functions G1(p) and G2(p) are given by equations (4a) and (6a) respectively, the following relationships hold.

$$\phi(p) = L2 \cdot I_o(p) = L2 \cdot I_{oR}(p) \tag{11}$$

$$I1_q(p) = -I2_q(p) = W_{S1} \cdot \phi(p)/R2 \tag{12}$$

The slip angular frequency signal $W_{S1}$ can be obtained from equations (11) and (12) as follows $$W_{S1} = (I1_q)(p)/(I_{oR})(p) \cdot R2/L2 \tag{13}$$

The term $I1_q/I_{oR}$ of equation (13) is formed by the divider 22 and the term R2/L2 of the same is formed by the amplifier 24. The divider 22 together with the amplifier 24 forms a slip frequency signal synthesizing circuit 25.

The current component $I1_q$ is applied to multipliers 26 and 30, while the current component $I1_d$ is applied to multipliers 28 and 32. A first phase signal $e\alpha$ is applied to the multipliers 28 and 30 as a multiplier, whereas a second phase signal $e\beta$ is applied to the multiplier 26 and a third phase signal $\overline{e\beta}$ having the opposite phase as the signal $e\beta$ is applied to the multiplier 26. Signals $e\alpha$, $e\beta$ and $\overline{e\beta}$ are generated by a two phase oscillator 34. The signal $e\alpha$ has a phase difference of 90° with respect to the signals $e\beta$ and $\overline{e\beta}$. Where the signal $e\alpha$ is a sine wave, for example, the signal $e\beta(=-\overline{e\beta})$ is a cosine wave.

The outputs of the multipliers 26 and 28 are added together by an adder 36 to form a first drive signal $ea$ similarly, the output of the multipliers 30 and 32 are added together by an adder 38 to form a second drive signal $eb$. The multipliers 26 through 32 and adders 36 and 38 constitute a mathematical operation circuit 39.

The slip angular frequency signal $W_{S1}$ is applied to an adder 40 together with an angular frequency signal $W_r$ generated by the tachometer generator 15 and proportional to the speed of the motor 14. An angular frequency control signal $W_o$, that is the output of the adder 40 is applied to the two phase oscillator 34 to act as the control signal of the frequency of the field flux $\phi$. Thus, the relationship among the angular frequency $W_o$ of signals $e\alpha$ and $e\beta$ or the angular frequency $W_o$ of the field flux $\phi$, $W_{S1}$ and $W_r$ is expressed by the following equation $$W_o = W_{S1} + W_r \tag{14}$$

Circuit elements 26 through 24 constitute a drive signal forming circuit 42. Which forms drive signals $e\alpha$ and $eb$ expressed by the following equations.

$$ea = e\beta I1_q + e\alpha I1_d \tag{15}$$

$$eb = e\alpha I1_q + \overline{e\beta}I1_d \tag{16}$$

The drive signal $ea$ is applied to a first primary winding $14_1$ of the motor 14 via a first drive circuit 44 whereas the drive signal $eb$ is applied to a second primary winding $14_2$ of the motor 14 via a second drive circuit 46. The driving circuits 44 and 46 are provided to convert the drive signals $ea$ and $eb$ into the first and second primary currents $I1_a$ and $I1_b$ respectively, and constructed as follows. More particularly, signal $ea$ is applied to a power amplifier $44_1$ via a subtractor $44_2$. A portion of the first primary current $I1_a$ supplied to the first primary winding $14_1$ is negatively fed back to the subtractor $44_2$ as a feedback signal $ef_a$ by a current detector $44_3$ so as to cause the driving circuit 44 to produce $I1_a$ which is directly proportional to signal $ea$. In the same manner, the second primary current $I1_b$ supplied to the second primary winding $14_2$ by the driving circuit 46 is made to be directly proportional to signal $eb$.

With the construction described above the relationships between the current component $I1_q$ and the torque instruction $T_R$ and between the current component $I1_d$ and the exciting current instruction $I_{oR}$ can be summarized as follows.

$$I1_q(p) = \frac{L2}{M^2} \cdot \frac{T_R(p)}{I_{oR}(p)} \tag{17}$$

$$I1_d(p) = G2(p) \cdot I_{oR}(p) \tag{18}$$

Assume now that the transfer functions $I1_a/ea$ and $I1_q/eb$ of the first and second driving circuits 44 and 46 are respectively equal to "1", equations (15) and (16) are rewritten as follows.

$$I1_a = e\beta I1_q + e\alpha I1_d \tag{19}$$

$$I1_q = e\alpha I1_q + \overline{e\beta}I1_d \tag{20}$$

From equations (17) and (20), it can be understood that it is possible to linearly control the primary currents $I1_a$ and $I1_b$ by the instructions $T_R$ and $I_{oR}$. It is also to be noted that by using the transfer function G2(p) it is not only possible to increase the response speed of the flux control but also to make contant the transfer function of the entire system. When the transfer function of the entire system is constant, high stability can be attained where the field flux $\phi$ and the output torque T of the motor 14 are controlled automatically.

In FIG. 6, the circuit elements 25, 42, 44 and 46 constitute a frequency connector, while circuit elements 16, 18 to 46 constitute a control unit 47.

The two phase oscillator 34 may be constituted by a well known voltage controlled triangular wave generator and a sine/cosine function generator. For example, the two phase oscillator 34 may be constituted by supplying the output triangular wave of a voltage to frequency converter utilizing type VFC 32 integrated circuit manufactured by BURR-BROWN CO., USA, to the input terminal of a four quadrant sine/cosine function generator disclosed on page, FIG. 7 of a data sheet of MODEL 4118/25 integrated circuit manufactured by the same company. The data sheet (PDS-224D) of the model 4118/25 was printed in USA in October 1973, and the data sheet (PDS-372) of the type VFC 32 was printed in USA in April 1977.

The drive circuits 44 and 46 may be substituted by pulse width modulation inverters or cycloconverters, the former being disclosed in IEEE Transaction, November/December, 1967, while the latter in IEEE Transaction, July/August 1972.

Figure 7:
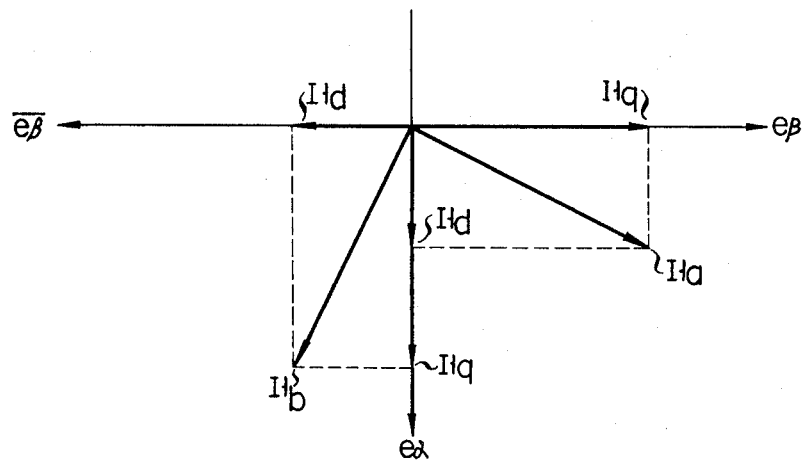
FIG. 7 is a vector diagram illustrating the primary currents $Il_a$ and $Il_b$ formed by the control device shown in FIG. 6.

FIG. 7 is a vector diagram showing the relationship of equations (19) and (20).

Figure 8:
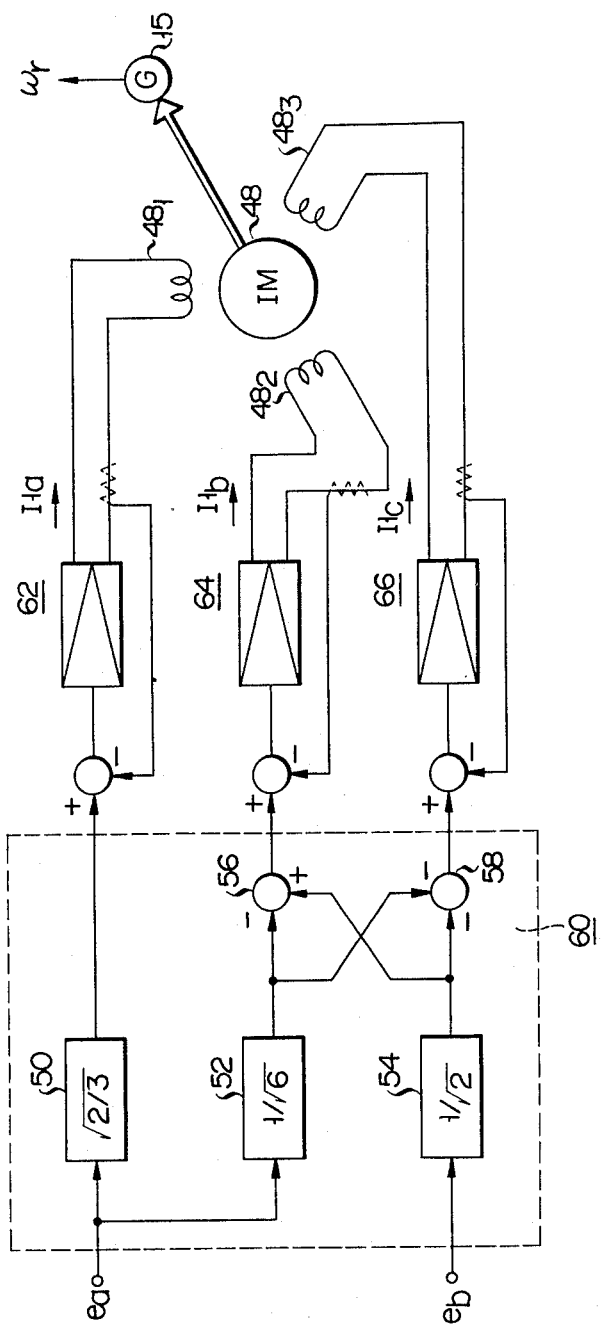
FIG. 8 is a connection diagram showing the application of the control device shown in FIG. 6 to a three phase induction motor.

FIG. 8 is a block diagram employed together with the control device shown in FIG. 6 as applied to the control of a three phase induction motor 48. The first drive signal $ea$ is applied to first and second constant amplifiers 50 and 52, whereas the second drive signal eb is applied to the third constant amplifier 54. The amplifiers 50, 52 and 54 amplify the applied signals with $\sqrt{2/3}$, $1/\sqrt{6}$ and $1/\sqrt{2}$ respectively. The output signal $1/\sqrt{6}\cdot ea$ of the amplifier 52 is applied to the negative terminal of a subtractor 56 and to the first negative terminal of an inversion adder 58. The output signal $1/\sqrt{2}\cdot eb$ of the amplifier 54 is applied to the positive input of the subtractor 56 and the second negative input terminal of the inversion adder 58. The amplifiers 50, 52 and 54, and the adders 56 and 58 constitute a two phase-three phase converter 60.

The output $\sqrt{2/3}\cdot ea$ of the amplifier 50 is converted into a first primary current $I1_a$ by a first drive circuit 62 and the output $(-1/\sqrt{6}\cdot ea + 1/\sqrt{2}\cdot eb)$ of the subtractor 56 is converted into a second primary current $I1_b$ by a second drive circuit 64. The output $(-1\sqrt{6}\cdot ea - 1/\sqrt{2}\cdot eb)$ of the inversion added 58 is connected into a third primary current $I1_c$ by a third drive circuit 66. The primary currents $I1_a$, $I1_b$ and $I1_c$ are supplied to first, second and third primary windings $48_1$, $48_2$ and $48_3$ respectively of the motor 48.

Figure 9:
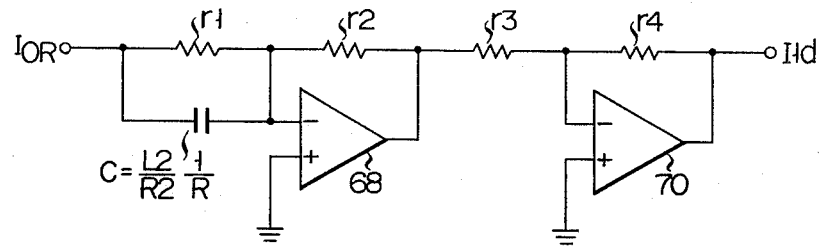
FIGS. 9 to 11 are circuit diagrams of different examples of the compensating circuit 16 shown in FIG. 6 utilized to obtain the transfer function G2.
Figure 10:
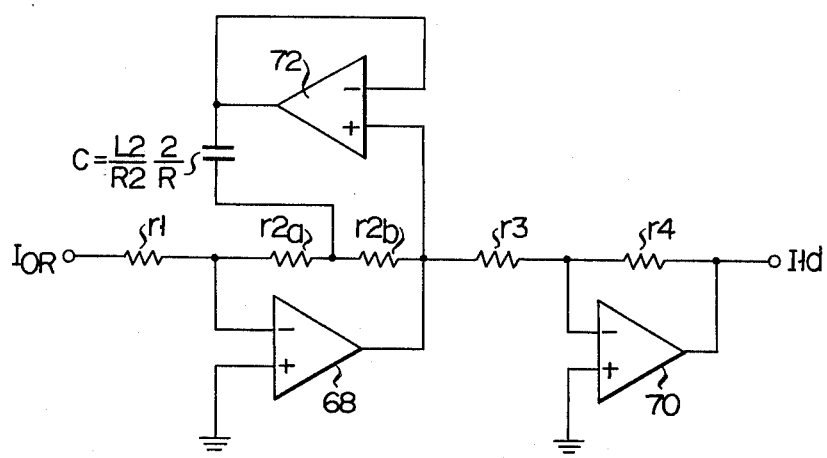
Figure 11:
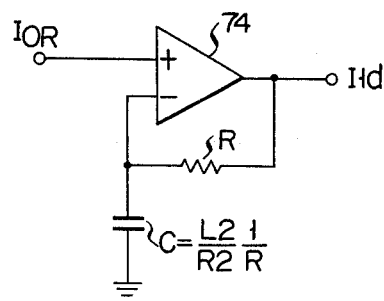

FIGS. 9 through 11 show examples of the compensating circuit 16 shown in FIG. 6. It is now assumed that the transfer function G2(p) is shown by equation (6a). Referring first to FIG. 9, the instruction $I_{oR}$ is applied to the inverted input terminal of an amplifier 68 through a parallel circuit comprising a resistor r1 and a capacitor C. The inverted input terminal of the amplifier 68 is connected to its output terminnal through a resistor r2. The output terminal of the amplifier 68 is connected to the inverted input terminal of an amplifier 70 via resistor r3 while the inverted input terminal and the output terminal of the amplifier 70 are inter-connected through a resistor r4. The non-inverted input terminals of the amplifiers 68 and 70 are grounded. In this circuit, it is assumed that each of the resistors r1 through r4 has a value of R, and that the capacitor C has a capacitance of $L2/R2\cdot 1/R$. Then the transfer function G2(p) of the circuit shown in FIG. 9 would be expressed by equation (6a).

FIG. 10 shows a modification of the circuit shown in FIG. 9 in which the non-inverted input terminal and the output terminal of the amplifier 68 are connected together through serially connected two resistors $r2_a$ and $r2_b$, and the output terminal of the amplifier 68 is connected to one input of a buffer amplifier 72 having an unity amplification factor. The output terminal of the buffer amplifier 72 is connected to the juncture between resistors $r2_a$ and $r2_b$ through a capacitor C. The circuit comprising the buffer amplifier 72, capacitor C and resistors $r2_a$ and $r2_b$ comprise a circuit generally known as a semiconductor inductance. In the circuit shown in FIG. 10 if it is selected that $r1=r2_a=r2_b=\frac{1}{2}r3=r4=R$ and that $C=(L2/R2)\cdot(2/R)$, then a transfer function shown by equation (6a) could be obtained. FIG. 11 shows still another modification of the circuit shown in FIG. 9 in which the instruction $I_{oR}$ is applied to the non-inverted input terminal of an amplifier 74 having an output terminal connected to the inverted input terminal through a resistor R and the inverted input terminal is grounded via a capacitor C so as to produce current component $I1_d$ from the output terminal. In this circuit, where it is selected that $C=(L2/R2)\cdot(1/R)$, a transfer function shown by equation (6a) could be obtained.

Figure 12:
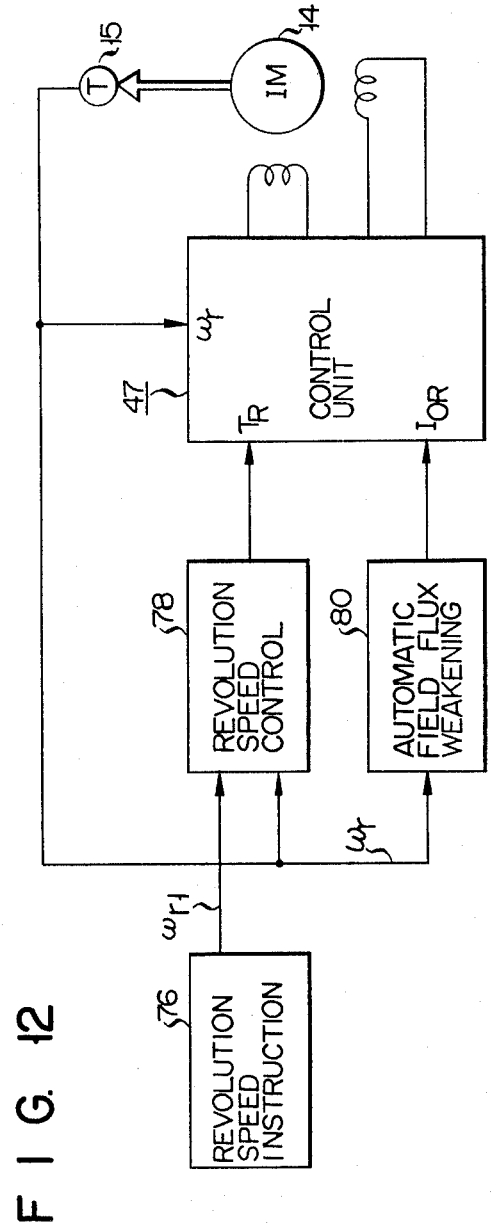
FIG. 12 is a block diagram showing the application of the control device shown in FIG. 6 to a closed loop type speed control system.

FIG. 12 is a block diagram showing an application of the control unit 47 shown in FIG. 6 to a closed loop type speed control system of an induction motor. More particularly, a speed instruction signal $W_{r1}$ generated by a speed instruction circuit 76 is applied to a speed control circuit 78 together with the angular frequency signal $W_r$ generated by the tachometer generator 15 coupled to the induction motor 14. Signals $w_{r1}$ and $W_r$ are compared and arithmetically operated by the speed control circuit 78 to produce a torque instruction $T_R$. The signal $W_r$ is also applied to an automatic field weakening circuit 80 to produce an exciting current instruction $I_{oR}$.

Figure 13:
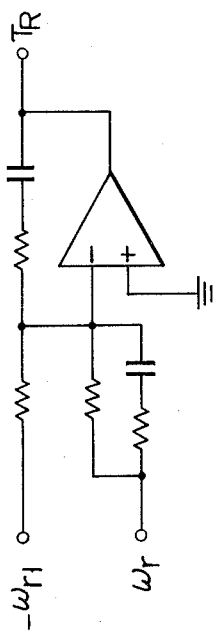
FIG. 13 is a circuit diagram showing one example the speed control circuit 78 shown in FIG. 12.

FIG. 13 shows the detail of the speed control circuit 78 shown in FIG. 12 in which the speed instruction signal $W_{r1}$ and the angular frequency signal $W_r$ are compared with each other, and subjected to such arithmetic operations as proportional compounding, integration and differentiation.

Figure 14:
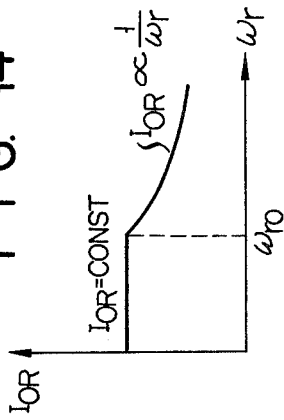
FIG. 14 is a graph illustrating one example of the characteristic of the automatic field weakening circuit shown in FIG. 12.

FIG. 14 is a graph showing the characteristic of the automatic field weakening circuit 80 shown in FIG. 12. Where it is desired to increase the speed of the motor 14 beyond a predetermined value the automatic field weakening circuit 80 operates to decrease the field current instruction $I_{oR}$. Thus, this circuit 80 has a characteristic such that when the angular frequency signal $W_r$ is smaller than a predetermined value $W_{ro}$ it maintains the instruction $I_{oR}$ at a constant value whereas when the signal $W_r$ exceeds the predetermined value $W_{ro}$, the circuit 80 varies the instruction $I_{oR}$ inversely proportionally to the signal $W_r$. The use of such automatic field weakening circuit 80 is effective where it is desired to operate the induction motor 14 at high speeds irrespective of the limited output voltage of the control unit 47. The characteristic shown in FIG. 14 can be prescribed by a diode polygonal segment approximation circuit shown in a paper "Operational Amplifiers Design and Applications" Published by Burr-Brown Co. page 252, FIG. 7.20.

Although specific embodiments have been illustrated and described herein above, it is not intended that the invention be limited to the specific embodiments disclosed. One skilled in the art will recognize that any other circuit elements may be used without departing from the scope and spirit of the invention or defined in the appended claims.

What is claimed is:

1. A control device of an induction motor comprising:
   first instruction setting means for producing a first instruction signal which sets a first signal corresponding to a first current component, said first current component having the same phase as an exciting current of a primary current supplied to a primary winding of said induction motor;
   second instruction setting means for producing a second instruction signal which sets a second signal corresponding to a second current component, said second current component having a phase difference of 90° with respect to said first current component;
   arithmetical operating means for producing a drive signal which contain said first and second current components as an amplitude component and phase components;
   drive means responsive to said drive signal for supplying said primary current to the primary winding of said induction motor; and
   open loop compensating means interposed in series between said first instruction signal setting means and the primary windings of said induction motor for compensating for the delay of response of said field flux to said first instruction signal; said open loop compensating means comprising a transfer function of a linear advanced system.

2. The control device according to claim 1 which further comprises means for establishing a proportional relationship between a torque instruction signal and an output torque of said induction motor which connects said second instruction signal into said second current component so as to make said output torque to be proportional to said second instruction signal provided by said second instruction setting means irrespective of the variation in said first instruction signal provided by said first instruction setting means, said proportional relationship establishing means being connected between said second instruction setting means and said arithmetical operating means and including a divider which divides said second instruction signal with said first instruction signal.

3. The control device according to claim 1 or 2 wherein said open loop compensating means is connected between said first instruction setting means and said arithmetic operating means so as to receive said first instruction signal at its input terminal and to produce said first signal corresponding to said first current component from its output terminal, a second transfer function of said compensating means being selected such that the product of said second transfer function and a first transfer function of said exciting current would be a constant.

4. A control device of an induction motor comprising:
   detection means for generating an angular frequency signal corresponding to the speed of said induction motor;
   first instruction setting means for producing a first instruction signal which sets a first signal corresponding to a first current component; said first current component having the same phase as an exciting current of a primary current supplied to a primary winding of said induction motor;
   second instruction setting means for producing a second instruction signal which sets a second signal corresponding to a second current component, said second current component having a phase difference of 90° with respect to said first current component;
   slip frequency signal synthesizing means for synthesizing said second signal corresponding to said second current component and said first instruction signal for producing a slip frequency signal corresponding to a slip of said induction motor;
   addition means for adding together said angular frequency signal and said slip frequency signal to produce a frequency control signal having a frequency corresponding to the frequency of the field flux of said induction motor;
   arithmetical operating means for producing a drive signal which contain said first and second current components as an amplitude component and phase components; said arithmetical operating means being controlled by said frequency control signal such that said drive signal will have the same frequency as that of said field flux;
   drive means responsive to said drive signal for supplying said primary current to the primary winding of said induction motor; and
   open loop compensating means interposed in series between said first instruction signal setting means and the primary winding of said induction motor for compensating for the delay of response of said field flux to said first instruction signal; said compensating means comprises a transfer function of a linear advanced system.

5. The control device according to claim 4 which further comprises an automatic field weakening circuit included in said first instruction setting means, and connected to revive said angular frequency signal produced by said detection means;
   a speed control circuit included in said second instruction setting means and connected to revive said angular frequency signal, and a speed proportional signal acting as a reference signal with said angular frequency signal; and
   a speed instruction circuit for providing said speed proportional signal to said speed control circuit.

6. A control device of an induction motor comprising:
   detection means for generating an angular frequency signal corresponding to the speed of said induction motor;
   first instruction setting means for producing a first instruction signal which sets a first signal corresponding to a first current component, said first current component having the same phase as an exciting current of a primary current supplied to a primary winding of said induction motor;
   second instruction setting means for producing a second instruction signal which sets a second signal corresponding to a second current component, said second current component having a phase difference of 90° with respect to said first current component;
   slip frequency signal synthesizing means "(25)" for synthesizing said second signal corresponding to said second current component and said first instruction signal for producing a slip frequency signal corresponding to a slip of said induction motor;
   addition means for adding together said angular frequency signal and said slip frequency signal to produce a frequency control signal having a frequency corresponding to the frequency of the field flux of said induction motor;
   multiphase signal generating means which generates a first phase signal and a second phase signal having a phase difference of 90°, said multiphase signal generating means being controlled by said frequency control signal such that said first and second phase signals will have the same frequency as that of said field flux;
   arithmetical operating means for producing first drive signals which contain said first and second current components as an amplitude component, and said first and second phase signals as frequency and phase components; said arithmetic operating means being supplied with said first and second signals respectively corresponding to said first and second current components, and said first and second phase signals;
   two phase-three phase converting means for converting said first drive signals of two phase to second drive signals of three phase of which phase difference is 120°;

drive means responsive to said drive signals for supplying said primary current to the primary winding of said induction motor; and open loop compensating means interposed in series between said first instruction signal setting means and the primary winding of said induction motor for compensating for the delay of response of said field flux to said first instruction signal; said open loop compensating means providing a second transfer function such that the resultant of a first transfer function of said exciting current which produces the magnetic flux in response to said first current component, and said second transfer function will be constant.

* * * * *